UNITED STATES PATENT OFFICE.

NOAH WRINKLE AND ROBERT G. PADDOCK, OF SAN FRANCISCO, CALIFORNIA, ASSIGNORS TO NATURAL SODA PRODUCTS COMPANY, OF SAN FRANCISCO, CALIFORNIA, A CORPORATION OF CALIFORNIA.

METHOD OF OBTAINING BICARBONATE OF SODA.

1,000,138.  Specification of Letters Patent.  Patented Aug. 8, 1911.

No Drawing.  Application filed May 23, 1910.  Serial No. 562,893.

*To all whom it may concern:*

Be it known that we, NOAH WRINKLE and ROBERT G. PADDOCK, citizens of the United States of America, residing in the city and county of San Francisco and State of California, have invented new and useful Improvements in Methods for Obtaining Bi-carbonate of Soda, of which the following is a specification.

Our invention relates to methods for obtaining acid carbonate of soda which is commonly known as bi-carbonate of soda, and has for its object to provide a process for obtaining bi-carbonate of soda, of a grade approximately chemically pure, for commercial purposes, from waters of certain lakes which contain both acid and normal carbonates of soda, the normal being in excess; and also various contaminating substances, as sodium chlorid and sulfate in solution, and organic matter in suspension; and we accomplish our objects by a novel series of steps, arranged to obtain the results desired with improved efficiency and economy.

In broad terms, our invention consists, first, in freeing the waters of substances in suspension by filtration, and thereafter of causing by evaporation the normal and acid carbonates to unite and crystallize out in the form of urao, leaving the excess of normal carbonate and the contaminating salts in the mother liquor, separating and dissolving the urao and treating the same with carbon dioxid to change the normal carbonate into acid carbonate, separating all but about ten per cent. of the acid carbonate from the liquor, and uniting the mother liquor of the carbonating step with the lake waters, that are being evaporated to form an increased quantity of urao.

Explaining the steps of our process in detail, we first subject the lake water to filtration, to separate the suspended matter, which usually consists of organic remains. We then proceed to evaporate the filtered solution, the object being to separate the acid and normal carbonates from the contaminating salts. This separation takes place when the solution attains a density of 32 degrees Baumé, at a temperature above 60° Fahrenheit, produced in the solution by solar heat, which we use as the evaporating agent. At the aforesaid density, and in the presence of sodium chlorid, acid carbonate and normal carbonate will unite to form urao, and the urao will crystallize and precipitate. The urao referred to is a compound, sometimes called natural soda, having approximately the chemical formula

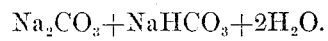

$$Na_2CO_3 + NaHCO_3 + 2H_2O.$$

The contaminating salts remain in the mother liquor, as does also the excess of normal carbonate; and we draw off the mother liquor before increasing density causes the deposition of the contaminating salts aforesaid. Having separated the urao from the contaminating salts, we next dissolve the urao in fresh water, to form a solution of urao. The aforesaid solution is then subjected to a treatment of carbon dioxid gas under pressure for the purpose of converting the normal carbonate into acid carbonate. We next separate the crystals of bicarbonate of soda from the solution, which retains in solution about ten per cent. of bicarbonate of soda. But the efficiency of our process is further increased by the next step, which consists in combining the lake waters undergoing evaporation with the mother liquor of the carbonating operation; and since the lake water contains normal carbonate of soda, and the mother liquor from the carbonating operation contains acid carbonate of soda, their union forms the compound urao from which more acid carbonate may be and is manufactured in the same manner as above described.

In applying our process to the deposits left on the lake shores by the recession of the waters, we dissolve the deposits by adding waters from extraneous sources and treat the solution in the same manner as the natural waters, that is, by combining the mother liquor from the carbonating operation with suitable quantities of the solutions the mother liquor from the evaporating operation, or with the fresh solutions, or with admixtures of fresh solutions. In carrying out the steps of the process we construct dikes out of the clay which abounds in the vicinity, inclosing the deposits in vats, basins or other containers wherein the solutions may be treated separately.

Having described our invention, what we claim as new and desire to secure by Letters Patent of the United States is:

The method for obtaining bicarbonate of soda for commercial purposes from waters containing acid and normal carbonates of soda, the normal being in excess, organic matter in suspension and sodium chlorid and sulfate in solution, which consists in freeing the waters of the suspended organic matter by filtration, evaporating the waters by solar heat to extract therefrom urao in sufficient amount to exhaust the said acid carbonate component, leaving in the solution the excess of normal carbonate, separating the urao from the mother liquor, dissolving the urao in fresh water, carbonating the solution of urao to form acid carbonate of soda from the normal carbonate constituent, depositing and recovering all but about ten per cent. of the acid carbonate from the solution, and uniting said solution with a further quantity of the said waters that are being evaporated, to form a greater quantity of urao than would result from evaporation of water not so treated.

In witness whereof, we have, each of us for himself, hereunto signed our names, in the presence of the witnesses whose signatures as such witnesses are hereunto subscribed, in the city and county of San Francisco and State of California, this 22d day of March, in the year 1910.

NOAH WRINKLE.
ROBERT G. PADDOCK.

In the presence of—
P. J. O'DEA,
FRANK P. MEDINA.